J. S. BLOWSKI.
PROCESS FOR THE CONCENTRATION OF NITROGEN OXIDES.
APPLICATION FILED MAY 24, 1920.
1,434,674.
Patented Nov. 7, 1922.
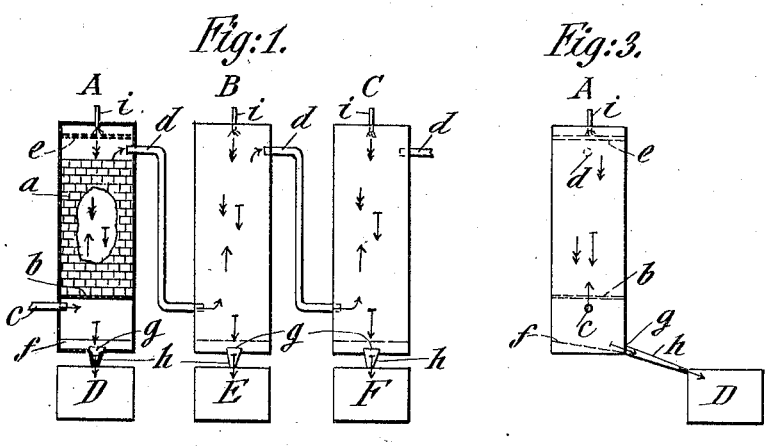
*Fig. 1.*
*Fig. 3.*
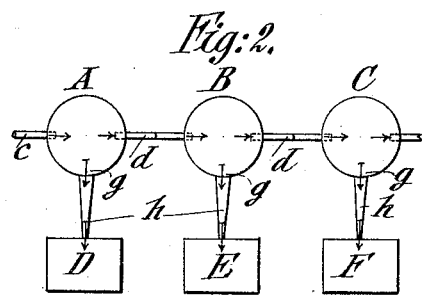
*Fig. 2.*
LEGEND
→ COURSE OF NITROUS GASES THROUGH SYSTEM.
↠ H₂SO₄ STREAMS FLOWING THROUGH TOWER.
↦ NITROSYLSULPHURIC ACID CRYSTALS AND NITROSYLSULPHURIC ACID SOLUTION IN H₂SO₄.
INVENTOR
John S. Blowski
BY Mock & Blum
ATTORNEYS Patented Nov. 7, 1922.

1,434,674

UNITED STATES PATENT OFFICE.

JOHN S. BLOWSKI, OF OAKLAND, CALIFORNIA.

PROCESS FOR THE CONCENTRATION OF NITROGEN OXIDES.

Application filed May 24, 1920. Serial No. 383,664.

*To all whom it may concern:*

Be it known that I, JOHN S. BLOWSKI, a citizen of the United States, residing at 1420 Magnolia Street, Oakland, in the county of Alameda and State of California, have invented certain new and useful Improvements in Processes for the Concentration of Nitrogen Oxides, of which the following is a specification.

My invention has for its object the concentration of dilute nitrogen oxides.

In treating gaseous mixtures of nitrogen and oxygen in electric furnaces the nitrous gases are contained in a very dilute state, which condition results in a comparatively dilute acid being obtained upon the absorption of the gases in water in the customary absorption towers for the production of nitric acid, and correspondingly introduces other disadvantages when said gases are utilized or treated in other ways. Besides being capable of yielding only a comparatively dilute nitric acid when absorbed in water in the dilute state, the amount of absorption tower space required for the treatment of such dilute gases is much greater per unit of absolute acid produced than is the case when absorbing more concentrated gases. It therefore becomes desirable that the gases to be absorbed be obtained in as concentrated a form as possible, and a process by which the dilute nitrous gases from the furnace may be treated so as to be converted into a gas more concentrated in its content of nitrogen oxides, becomes of great value.

It is a well-known fact that nitrous gases are readily absorbed in strong sulphuric acid, with the formation of nitrosyl-sulphuric acid,

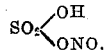

The further fact is also known that nitrosyl-sulphuric acid decomposes upon suitable treatment with water. Processes for the concentration of nitrous oxides have in fact been hitherto proposed consisting in the absorption of such dilute electric furnace gases as are alluded to above, in strong sulphuric acid with the resulting production of a solution of nitrosyl-sulphuric acid in sulphuric acid, and the subsequent dilution of such solution of nitrosyl-sulphuric acid with water; but such processes have not proved economically practicable due to the expense involved in reconcentrating the sulphuric acid so diluted, for re-use in the process.

The object of the present invention is to remove the foregoing objection, and to enable the use of the principle mentioned in a manner economically profitable.

I have found that if nitrous oxides (such as for instance those produced by the treatment of gaseous mixtures of nitrogen and oxygen in electric furnaces) be passed into strong sulphuric acid, absorption of such nitrous oxides takes place with the formation of nitrosyl-sulphuric acid until saturation is reached, the percentage of nitrosyl-sulphuric acid in solution at such point of saturation being dependent upon the strength of the sulphuric acid used for absorption. This point of saturation may be roughly stated as at about ten to twelve per cent $N_2O_4$ content in the case of 66° Baumé acid and five to six per cent $N_2O_4$ content in the case of 60° Baumé acid. Upon such point of saturation being reached, nitrosyl-sulphuric acid continues to form, but is precipitated from the solution in a crystalline condition as rapidly as formed. Depending upon the relative amounts and concentrations of nitrous oxides and of sulphuric acid reacting, the ultimate result is either a precipitate of nitrosyl-sulphuric acid suspended in a saturated solution of the same material in sulphuric acid, or a mass consisting substantially entirely of nitrosyl-sulphuric acid crystals.

My process consists in passing nitrous oxides into sufficiently strong sulphuric acid (or into solution of nitrosyl-sulphuric acid in sulphuric acid) resulting in the precipitation of crystals of nitrosyl-sulphuric acid, decanting or otherwise substantially separating the excess, if any, of the saturated solution of nitrosyl-sulphuric acid in sulphuric acid from the crystals of nitrosyl-sulphuric acid so precipitated, and subsequently treating the crystalline precipitate of nitrosyl-sulphuric acid with steam or water with the resulting decomposition of the nitrosyl-sulphuric acid into nitric oxide (with or without other nitrous oxides), sulphuric acid and water (and also additionally upon occasion into nitric acid, according to the state of oxidation of the nitrous oxides previous to their absorption.) The gas so produced is very much more concentrated in its content of nitrogen oxides than the original gas treated, and may now be further oxidized and subjected to absorption in water for the production of nitric acid or may be treated in any other manner.

This process may of course be carried out in several different ways; as for instance, the gases may be passed through towers or other equipment receiving only sufficient sulphuric acid to form crystals of nitrosyl-sulphuric acid without allowing any excess of saturated acid solution to remain, and the crystals may then be removed periodically from the towers by flushing with a saturated solution of nitrosyl-sulphuric acid in sulphuric acid or in any other manner deemed desirable, after which the crystals are subjected to the treatment with steam or water for the liberation of the nitrogen oxides. I have generally found it convenient to work with sulphuric acid of about 60° Baumé, but the procedure embodied in this application is not limited to the use of acid of this strength, for without essentially changing the process, it may be carried out over a considerable range of concentrations, both above and below this strength.

To carry out the process hereinbefore described, I show an apparatus by means of which the objects of this invention may be carried out.

Figure 1 shows in outline an elevation partly in section of such an apparatus, Figure 2 being a plan thereof, and Figure 3 an end elevation of the first tower with its settling tank.

A, B and C represent absorption towers arranged in series, and connected by gas lines as indicated. These towers may be made of cast iron or any other material capable of withstanding the action of strong sulphuric acid, nitrogen oxides and the solution of nitrosyl-sulphuric acid. They are filled with suitable acid-resisting tower packing as indicated at $a$ of tower A, resting upon grids or grates of cast iron or other suitable material $b$. Gas inlets (as $c$ of tower A) are provided at a sufficient height above the bottom of the towers to assure safety from blockage in the event of the tower acid outlets (as $g$ of tower A) becoming clogged with the nitrosyl-sulphuric acid crystals which are being carried into the settling tanks or "crystal treaters" D, E and F. The gas outlets (as $d$ of tower A) are placed at a suitable distance above the tower packing $a$, but beneath the acid distributors $e$. The bottoms of the towers are inclined from the horizontal as shown at $f$ in tower A, both in the front and end elevations. These may be plane, or they may be concaved so as to facilitate guiding the crystalline mass toward the acid outlet $g$. $h$ of tower A, as indicated in both front and end elevations, is a pipe or conduit, for conveying the mixture of crystals and acid into the settling tanks or crystal treaters D, E or F. Although not indicated, each absorption tower should be provided with at least two such settling tanks. When one such tank is filled with the mixture of crystals and acid, the stream is switched to the second tank, while the crystals are allowed to settle from the acid in the first. After settling of the crystals, the acid is drawn off and again used for feeding into the absorption towers through the acid-feeding inlets as shown at $i$ of tower A.

D, E and F are closed tanks, of acid resisting material, provided with such manholes or other openings as may be found necessary, and they serve alternately as settling tanks and "crystal-treating tanks." They are provided with water or steam inlets, not shown, and with outlets for discharging the sulphuric acid (and any other liquid products such as nitric acid) resulting from the treatment, also not shown. They are further provided with gas outlets at the top (or cover) of the tank, whereby the nitric oxide (NO) or other nitrogen oxides resulting from the treatment are conducted away, and (after addition of air or oxygen and the allowance of a sufficient time of contact for proper oxidation) are passed into an absorption tower system for the production of nitric acid by absorption in water, or are treated in any other manner desired.

The progress of the process is readily apparent from the foregoing description of the apparatus or equipment. The dilute nitrous gases as obtained from electric furnaces or other sources and after being subjected to conditions proper for sufficient oxidation as in the Norwegian and other nitrogen-fixation processes, are conducted into the tower A, through the gas inlet $c$. The gas passes successively through the towers A, B and C, etc., where it is met by streams of strong sulphuric acid or of solution of nitrosyl-sulphuric acid in sulphuric acid introduced into the towers through the inlets $i$, and suitably distributed over the entire area of the tower packing $a$, by means of the distributor $e$.

D, E and F are closed tanks, of acid resisting material, shown in greater detail in Figure 4. They are provided with such manholes or other openings $j$, as may be found necessary for access, and they serve alternately as settling tanks and "crystal-treating" tanks. They are provided with "swing pipes" capable of being adjusted to any desired level, and which serve to convey away, by means of a pump or by siphoning, the supernatent acid, after the mass of crystals has properly subsided. These "swing-pipes" are not shown in the drawing. The tanks are further provided with water or steam inlets, $l$, and with the outlets $m$, for discharging the sulphuric acid (and any other liquid products such as nitric acid) resulting from the treatment with water. They are also provided with gas outlets, $n$, at the top (or cover) of the tank, whereby the nitric oxide (NO) or other nitrogen oxides resulting from the treatment are conducted away, and (after addition of air or oxygen and the allowance of a sufficient time of contact for proper oxidation) are passed into an absorption tower system for the production of nitric acid by absorption in water, or are treated in any other manner desired.

The nitrous oxides are initially absorbed in the sulphuric acid to the saturation point, after which precipitation of the crystals takes place. Depending upon the degree of oxidation of the nitrogen oxides, the reaction may be either

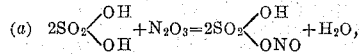

or

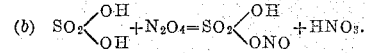

Conditions coducive to the presence of reaction ($a$) should be maintained so far as possible.

The gas leaving the last tower will still be likely to contain at least traces of nitrous oxides, and may be passed through such alkaline absorbents as sodium hydroxide, sodium carbonate or milk of lime, the last traces of nitrogen oxides being thus recovered.

The mixture of crystals of nitrosyl-sulphuric acid and sulphuric acid passes down the inclined conduits or pipes as $h$ of tower A into the settling tanks, as D of tower A. After the tank has been filled, the stream, as aforesaid, is switched to another similar tank, while the crystals are allowed to subside from the acid and the acid drawn off, the latter being then again suitable for reuse in the acid absorption towers, which towers, when such decanted acid is used, might be more properly termed "precipitation towers."

Steam or water is now introduced into the settling tank (as D of tower A), which tank at this stage of the process may be more appropriately termed a "crystal treating tank," where reaction ensues, which may be as expressed in any of the following, or by other equations:

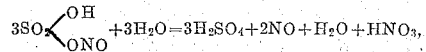

or

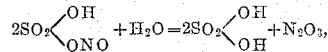

or

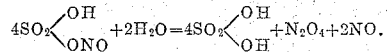

Regardless of the exact reactions taking place, the effect is the liberation of substantially all the oxides of nitrogen, either already in a sufficiently highly oxidized state for absorption in water with the production of nitric acid, or in a form whereby the addition of a sufficient amount of air or oxygen will bring them into this condition.

Under some conditions (as indicated in the first of the three above reactions), nitric acid may be formed during the operation of steam or water treatment, which of course may be distilled from the sulphuric acid should it accumulate to a degree where it adversely affects the equilibrium conditions necessary for the satisfactory operation of the process.

What I claim is:—

1. The process of concentrating nitrogen oxides by bringing gases containing nitrogen oxides in dilute condition in contact with sulphuric acid, subjecting such sulphuric acid to contact with said nitrogen oxides until solid nitrosyl-sulphuric acid is formed and subsequently decomposing the solid nitrosyl-sulphuric acid.

2. The process of concentrating nitrogen oxides by bringing gases containing nitrogen oxides in dilute condition in contact with 60° Baumé sulphuric acid, subjecting such sulphuric acid to contact with said nitrogen oxides until solid nitrosyl-sulphuric acid is formed and subsequently decomposing the solid nitrosyl-sulphuric acid.

3. The process of concentrating dilute nitrogen oxides by absorbing same in sulphuric acid until solid nitrosyl-sulphuric acid is formed and continuing such contact until a large percentage of the nitrogen oxides is obtained in the form of solid nitrosyl-sulphuric acid.

4. The method of preparing concentrated nitrogen oxides by bringing gases containing nitrogen oxides in dilute condition in contact with concentrated sulphuric acid, subjecting such sulphuric acid to contact with said nitrogen oxides until the maximum amount of solid nitrosyl-sulphuric acid is formed and subsequently decomposing the solid nitrosyl-sulphuric acid.

5. The method of preparing concentrated nitrogen oxides by bringing gases containing nitrogen oxides in dilute condition in contact with 60° Baumé sulphuric acid, subjecting such sulphuric acid to contact with said nitrogen oxides until a maximum amount of solid nitrosyl-sulphuric acid is formed and subsequently decomposing solid nitrosyl-sulphuric acid to generate concentrated nitrogen oxides.

6. The process of preparing concentrated nitrogen oxides by absorbing dilute nitrogen oxides in sulphuric acid until the maximum amount of solid nitrosyl-sulphuric acid is formed, separating the solid nitrosyl-sulphuric acid from the residue of nitrosyl-sulphuric acid in solution and treating said solid nitrosyl-sulphuric acid to obtain concentrated nitrogen oxides.

7. The process of preparing concentrated nitrogen oxides by bringing dilute nitrous gases in contact with concentrated sulphuric acid until a maximum precipitation of nitrosyl-sulphuric acid in solid form is produced, separating the solid nitrosyl-sulphuric acid from the solution of nitrosyl-sulphuric acid and subsequently decomposing the solid nitrosyl-sulphuric acid with an aqueous fluid so as to produce concentrated nitrogen oxides.

In testimony whereof I hereunto affix my signature.

JOHN S. BLOWSKI.